(No Model.)

T. J. HUBBELL.
HARROW.

No. 268,490. Patented Dec. 5, 1882.

Witnesses:
D. Selleck
Geo Vincent

Inventor:
Thomas J. Hubbell
By his Atty., Edward Ohm

N. PETERS. Photo-Lithographer, Washington, D. C.

UNITED STATES PATENT OFFICE.

THOMAS J. HUBBELL, OF REDWOOD CITY, CALIFORNIA.

HARROW.

SPECIFICATION forming part of Letters Patent No. 268,490, dated December 5, 1882.

Application filed May 31, 1882. (No model.)

*To all whom it may concern:*

Be it known that I, THOMAS J. HUBBELL, of Redwood City, in the county of San Mateo and State of California, have made and invented certain new and useful Improvements in Harrows; and I do hereby declare that the following is a full, clear, and exact description of the same.

The invention relates to harrows having pivoted teeth which can be turned completely down and form a smooth surface for pulling over the ground without making any incisions therein.

The invention will be understood as set forth in the following specification and claims.

Figure 1:
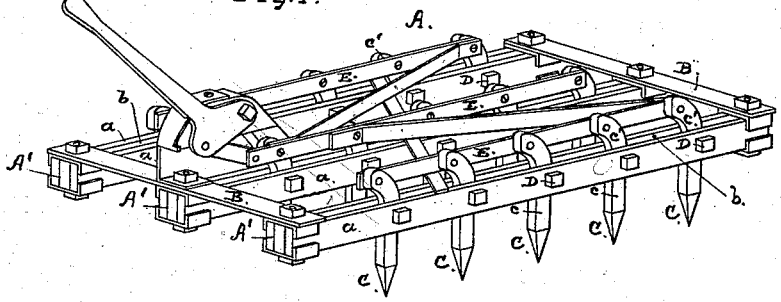
Figure 2:
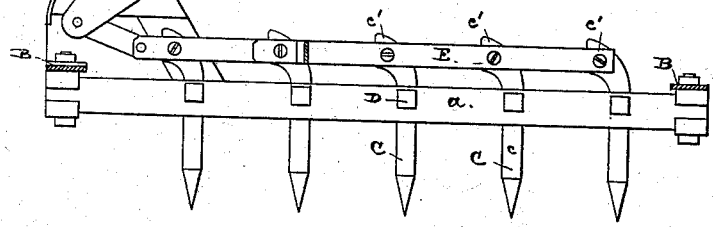
Figure 3:
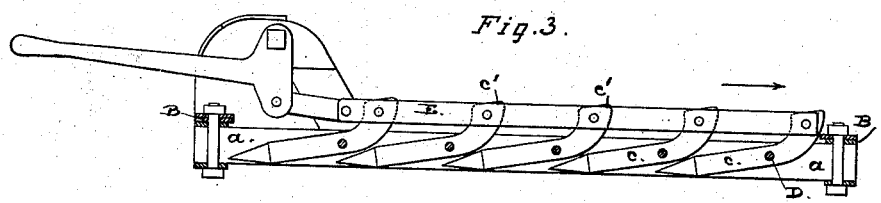

Figure 1 is a perspective view of a section of a harrow constructed according to my invention. Fig. 2 is a detail view of one of the tooth-carrying bars, with the teeth in position for work. Fig. 3 is a view with the teeth closed.

This harrow is formed of parts or sections A, coupled together, or of a single section, where less extent of surface is required. Such sections are connected together by hook-couplings or hinged rods in the usual manner of attaching sections of double harrows together, and the general construction of each section is the same. A description of one is applicable to the others.

A number of bars, A' A', each formed of a pair of narrow bars or slats, $a$ $a$, are secured together by cross-bars B B in position parallel with one another, but in an oblique position with respect to the connecting-bars B, so that the outline of the frame thus provided approaches or resembles that of a rhomb. This is the construction commonly adapted to bring the teeth of each bar out of line, so that the points where they act upon the ground shall be equidistant and parallel. The slats $a$ $a$, either of wood or metal, are secured together in close position and parallel to provide a slot, $b$, within which the teeth C are carried. By means of a through bolt or pin, D, each tooth is secured in place between the rails $a$, so that when in action its point and the principal part of the body $c$ project below the slot, while its head $c'$ extends above the bar; but when turned up into the horizontal the part of the tooth below the pivot closes into the space between the rails $a$, which, for this purpose, is made as nearly as possible of the same width as the thickness of the body of the teeth. The space between the teeth from one pivot to the other is governed by the length of tooth employed. The distance between them should be such that when the tooth is thrown back and up into the slot the edge of the tooth from the point along to the pivot should be flush with the bottom edges or faces of the rails $a$. The top of each tooth has a curve forward or toward the working-lever, which, when the teeth are turned down, points almost perpendicularly upward, so that the teeth shall lie one back of the other on approximately a horizontal line with regard to the portion which rests upon the ground. The curve at the top of the tooth makes it much easier for the teeth to be shifted, and brings them into the desired position for dragging over the ground without harrowing it, with much less change in the bar E. In the case of straight teeth it is almost impossible to drop them as we do, as the operating-bar must come on a line with the pivots before the teeth will assume the proper position. Thus a smooth surface, like the edge of a runner, is formed when all the teeth are closed into the slot, and the bar will pass over a surface without catching into or carrying with it in any manner. The beveled points of the teeth, as well as the curved shape given to the portion at and above the pivot enables the points of the belt to be thrown into the slot sufficiently to bring them in line with the bottom of the rails $a$. The series of teeth in each bar are connected together at the upper ends, $c'$, by a rod, E, which is in turn connected with a hand-lever provided at the rear of the harrow, so that all the teeth of the bar can be turned simultaneously and brought into perpendicular or working position, or else turned backward into the closed position between the rails by a single movement. By connecting together these rods E of all the bars A in the frame or position the lever serves to move all the teeth at the same time and with the same movement. The teeth have an upwardly-curved head to bring the pivots where the rod E is pivoted above the line of pivots D when the teeth are thrown into horizontal position, so that the backward motion of the rod to bring the teeth into the upright position is readily performed.

Having thus fully described my invention, what I claim, and desire to secure by Letters Patent, is—

1. In a pivoted toothed harrow, the combination of the bars $a$, in which the teeth are pivoted, and the connecting-rod E of the pivoted teeth C, having a lower straight portion, $c$, below the pivot-point, and an upper curved portion, $c'$, above said point, extending toward the source of operation, whereby the teeth may be brought to an approximate level on the under side, substantially as herein set forth.

2. In a pivoted toothed harrow, the combination, with the pivoted teeth C, having the top $c'$ curved as described, of double frame-pieces $a$, between which the teeth are pivoted, pivot-bars E, to which the curved tops of the teeth are pivoted, connecting-rods and lever for operating the same, whereby the teeth may be made to take a perpendicular, nearly horizontal, or any intermediate inclination, substantially as set forth.

Witness my hand and seal.

THOMAS J. HUBBELL. [L. S.]

Witnesses:
EDWARD E. OSBORN,
GEO. VINCENT.